United States Patent [19]

Hennick

[11] 4,435,079
[45] Mar. 6, 1984

[54] APPARATUS FOR TESTING LENSES BY DETERMINING BEST FOCUS

[75] Inventor: Robert P. Hennick, Dudley, Mass.

[73] Assignee: American Optical Corporation, Southbridge, Mass.

[21] Appl. No.: 297,183

[22] Filed: Aug. 28, 1981

[51] Int. Cl.³ .............................. G01B 9/00; G01J 1/00
[52] U.S. Cl. ....................................... 356/123; 356/125; 250/201
[58] Field of Search ................ 356/123, 124, 125, 127, 356/376, 400; 250/201

[56] References Cited

U.S. PATENT DOCUMENTS

| | | | |
|---|---|---|---|
| 3,967,056 | 6/1976 | Yata et al. | 178/7.2 |
| 4,288,710 | 9/1981 | Hamilton | 310/49 R |
| 4,373,804 | 2/1983 | Pryor et al. | 356/376 |

*Primary Examiner*—R. A. Rosenberger
*Attorney, Agent, or Firm*—Dennison, Meserole, Pollack & Scheiner

[57] ABSTRACT

A test lens and a photo-detector array are fixed in position along an optical axis a fixed distance from each other. Light is reflected by the front and rear surfaces of the test lens through an objective lens and is detected by the photo-detector array. The detected light is processed to produce a pixel count by video processing electronics. Control electronics adjusts the focusing of the objective lens by incremental displacement along the optical axis during a measurement cycle and significant focus position data is obtained from the video processing electronics to determine best focus location from which test lens data is derived.

11 Claims, 9 Drawing Figures

APPARATUS FOR TESTING LENSES BY DETERMINING BEST FOCUS

BACKGROUND OF THE INVENTION

This application is related to co-pending U.S. patent application Ser. No. 194,193, filed Feb. 25, 1980, now U.S. Pat. No. 4,288,710, the disclosure of which is incorporated by reference.

This invention relates to a system for measuring the base power and the radius of the base curve of an optical lens by determining the best focus of the lens.

Generally, it has been desirable to provide an accurate measurement of the various characteristics of optical lenses. Various prior art systems have taken advantage of electronic components in order to automatically perform a variety of tests on lenses. In one approach, a light beam source is scanned in a predetermined locus in the plane of the optical system. Refractive properties of the optical system under test are determined in relation to the instantaneous relative position at which the refracted light beam strikes a position-sensitive photoelectric surface. Another system measures a variety of lens characteristics by shifting the position of a phot-detector in the focal plane of the lens system, until the scanning light beam becomes centered on the detector, providing a zero output from the detector. Again, the light beam is scanned across the surface of the test lens to provide a measurement of refractive power. A common failing of the prior art systems is that the angle of refraction varies with the varying position of the light beam due to the relative motion between the light beam, the test lens, and the photo-detector. They simply detect the intensity of the refracted light beam as it varies with the angle of refraction. Further, this intensity signal depends upon a determination of the position at which the refracted light beam strikes the photo-detector. Thus, the need for scanning the light beam through a locus of positions may produce undesirable signal variations in accordance with the varying angles of refraction of the light beam by the test lens.

OBJECTS OF THE INVENTION

Accordingly, it is an object of the present invention to provide an extremely accurate lens meter which eliminates variation in light beam scanning and photosensor positioning by placing the test lens and a photo-detector array in fixed positions a predetermined distance apart and coupling a fixed light beam along the optical axis of the test lens.

It is a further object of the invention to accurately measure lens characteristics, such as base power and radius of curvature, by varying the focus of an otherwise fixed light beam through a movable optical lens arrangement during a measurement cycle.

Another object of the invention is to determine and record significant location data for algorithm processing through which a reliable determination of optimum focus location is made.

SUMMARY OF THE INVENTION

In the measuring system of the present invention, a test lens is centered on a three probe holder assembly, and positively held in a fixed position during a measurement cycle. A source of light supplies an interrogating light beam. This light source is coupled into the optical path of a movable focusing lens arrangement and, in turn, illuminates the test lens via an optical collimator group. The conjugate of the center of curvature of the front (or rear) test surface, a focused spot, is surveyed and focused by the optical system onto a spot image photo-detector. The photo-detector is fixed in position a given distance from the test lens. Focusing of the moving lens arrangement by a precision motion slide and focus adjusting motor provides position data in accordance with displacement.

The photo-detector array output or "pixels" indicate the number of individual picture elements activated. These pixels are counted and further processed according to preselected criteria. The variations in the pixel count are correlated with the displacement signals of a stepper type focus adjusting motor to provide data representative of best focus taking into account the nature of the signal output of the photo-detector and the stepping operation of the focus adjusting motor.

In the spot image detector, each element of the array is sampled during each step of increment of the focusing to determine whether it is activated or not. The focused spot on the detector covers at least four to six elements of the array before signal intensity exceeds a minimum threshold established by a filter on the light receiving surface of the detector. Electronic and signal level thresholds establish significant data points for algorithm processing at start and stop positions of a front curve and a rear curve throughout a focus range in order to provide data from which best focus location is determined by use of a maxima location technique.

Because of signal noise, crossover or cross talk, detector saturation before signal peaking, signal curve flatness adjacent the peak and other difficulties in critical curve point detection, ordinary signal peak detection techniques heretofore available are unsuitable for the purposes of the present invention. Accordingly, an important aspect of the present invention resides in establishment of various thresholds during the processing of the video signals or pixels generated by the radiation reflected from the test lens through the focusing lens to establish critical threshold points on a signal curve representing the variation in pixel count. The data represented by such critical threshold points is stored during a measurement cycle and a best focus location is then determined as a point on the signal curve equally spaced between two of the critical threshold points.

Further features and advantages of the present invention will be better understood from the following description of the preferred embodiments, with references to the accompanying drawings.

DETAILED DESCRIPTION OF THE INVENTION

Figure 1:
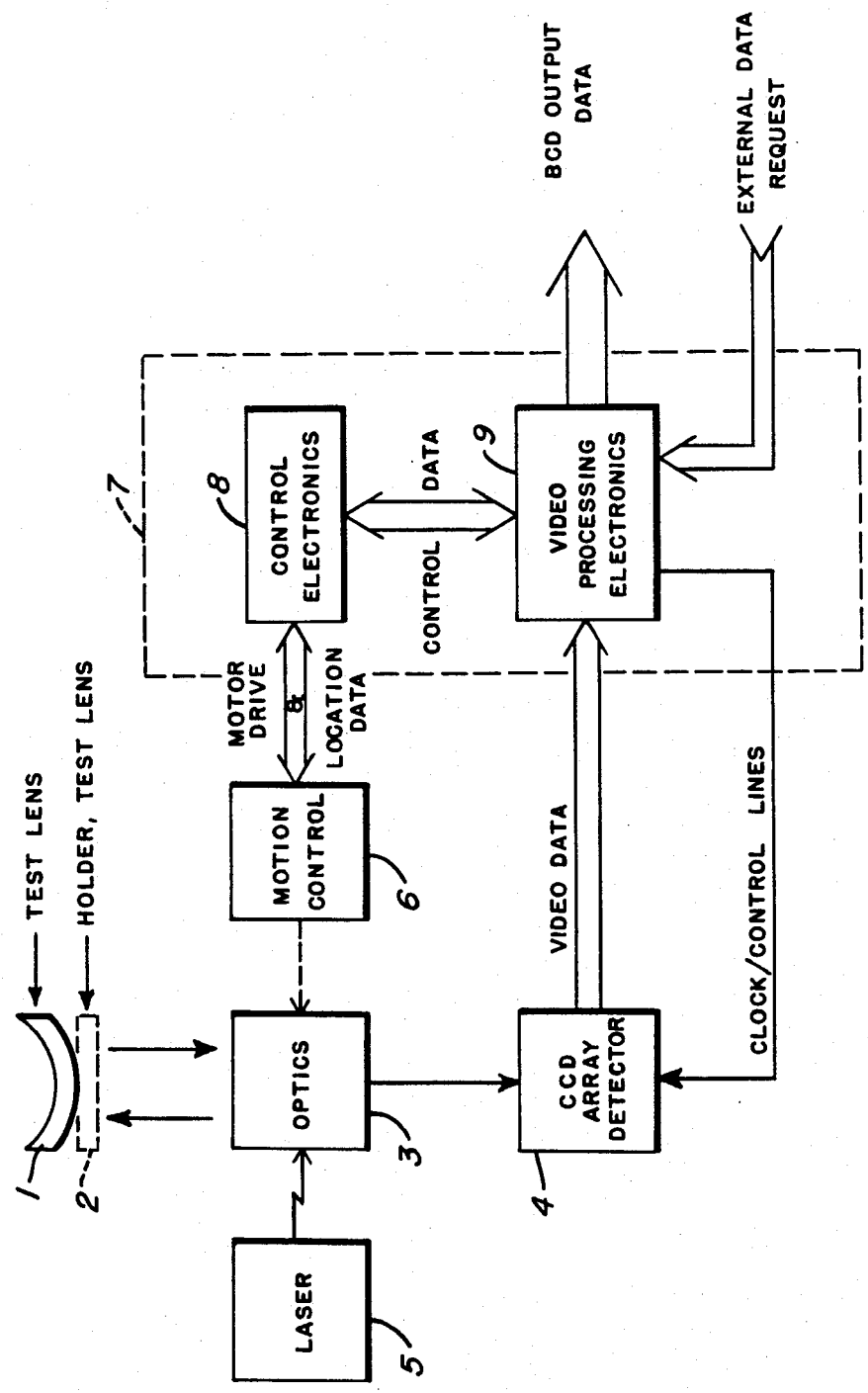
FIG. 1 shows in block diagram form the optical system, electronic signal processing system, and motion control system, and their relationship.

FIG. 1 shows the general relationship between the optical and electronic systems for measuring the characteristics of a test lens. Test lens 1, supported by test lens holder 2, is secured in position for an entire measurement cycle. Optical system 3 and an image spot sensor 4 are further arranged along the optical axis of test lens 1. The image spot sensor may be a solid state optical detector array including a photo-diode matrix on a chip, such as that manufactured by Reticon Corporation of Sunnyvale, Calif., under Model Nos. RA-50×50A and RA-32×32A. The image spot sensor is located in a fixed position, a predetermined distance from test lens 1. Optical system 3 couples a parent light beam from a light source, such as laser 5, along the optical axis of the test lens. Image focusing adjustment of the optical system 3 along the optical axis of the test lens is controlled by a motion control device 6. Electronic control and analyzing circuit 7 includes control electronics 8 and video processing electronics 9. The spot image sensor 4 provides video data and clock/control inputs to video processing electronics 9. Control electronics 8 provide motor drive signals to motion control 6, and receives location data representative of displacement of the movable optics. The location data is further coupled to video processing electronics 9, which provides a binary coded decimal output of best focus location data, upon receipt of an external data request signal. The arrangement and operation of the measurement system of FIG. 1 will be further described and explained in detail hereinafter.

Figure 2:
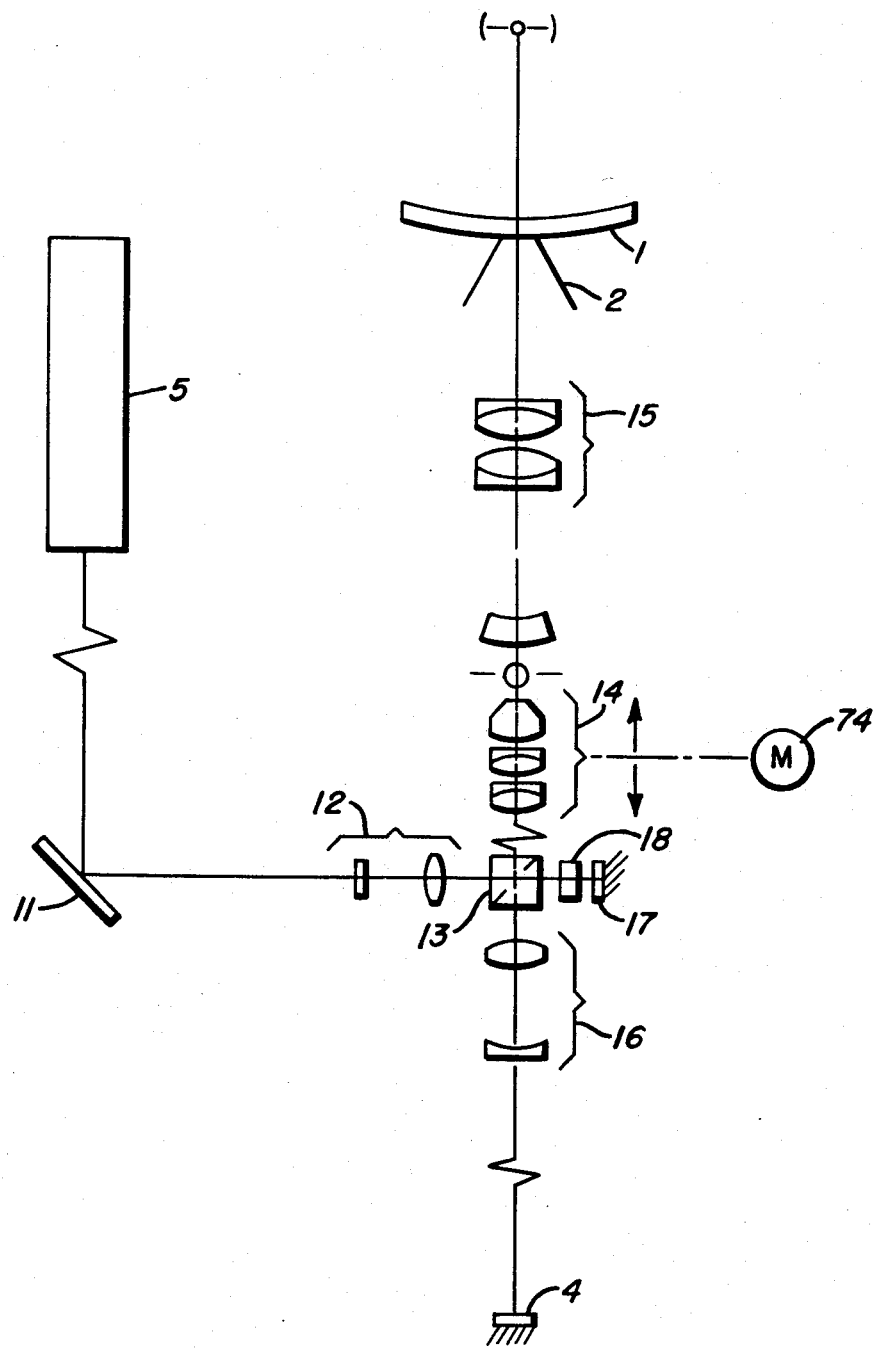
FIG. 2 is a diagram of the optical system of FIG. 1.

The optical system of FIG. 1 is shown in detail in FIG. 2. Any suitable source of bright light, such as laser 5, generates a light beam which is reflected by a plane mirror 11 along an optical path to a beam splitter 13 aligned with the optical axis of test lens 1. A beam expander 12 may be positioned in the optical path between mirror 11 and beam splitter 13 where a relatively thin beam is generated at source 5. Between beam splitter 13 and test lens 1 are positioned a moving lens group 14, such as a microscope objective lens assembly and a collimating lens 15. Lens holder 2, also known as a nosepiece, fixes the position of test lens 1, such that its center of curvature is located along the axis of the optical system. The image of the light beam striking the target surface of test lens 1 is reflected back along the optical axis through beam splitter 13 and detector collimator 16, onto the image sensor 4. The image sensor is fixedly positioned along the optical axis a given distance from test lens 1. There is no relative movement between the light beam coupled along the optical axis and either test lens 1 or sensor 4. There is also provided a beam monitoring detector 17 which receives a portion of the light beam through beam splitter 13 and two neutral density filters 18. The light dividing ratio selected for the beam splitter 13 will depend on the intensity of the light beam and the minimum required amount of reflected light reaching the image sensor 4.

In the operation of the optical system, collimating lens 15 will focus the light beam at the center of curvature of the test lens and produce the conjugate of the focused spot as a spot image on sensor 4. The moving lens group 14 is incrementally displaced along the optical axis during a measurement cycle to focus the reflected light from the test lens surface as the spot image on sensor 4.

Figure 3:
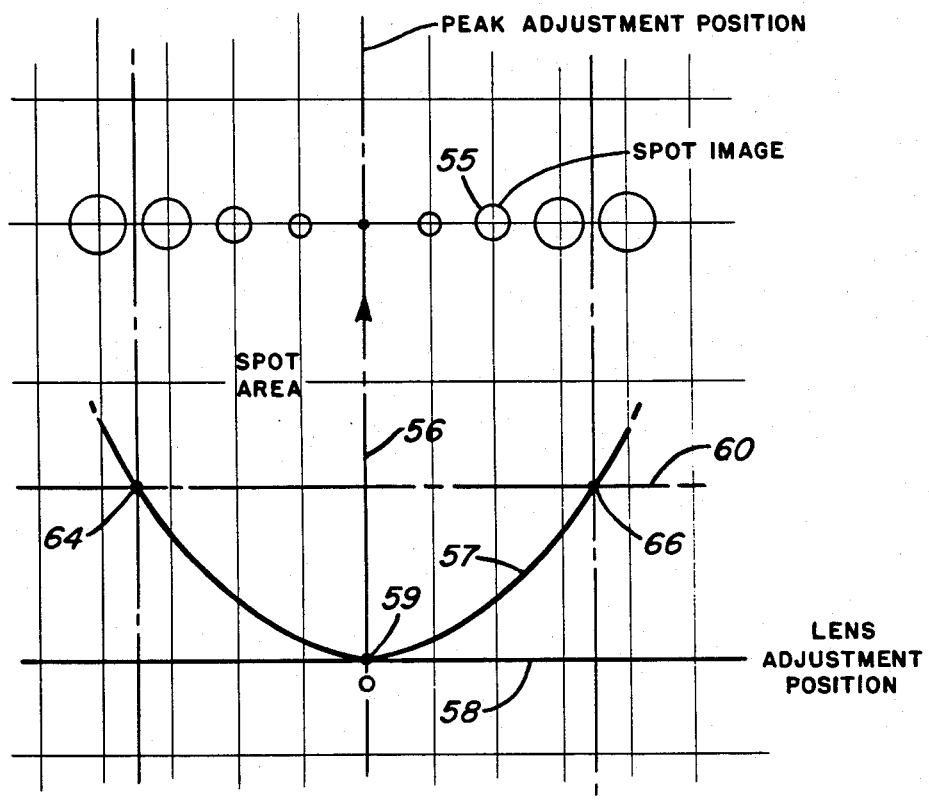
FIG. 3 is a graphical illustration of the variation in spot image area produced by focus adjustment during a measurement cycle.

When the light beam is in theoretically perfect focal adjustment, the light rays will impinge on the test lens surface at right angles to produce a point spot image on sensor 4 corresponding to a position of perfect focus adjustment of lens group 14. As the lens group 14 is incrementally displaced in either direction from the perfect adjustment position, the spot image is enlarged. FIG. 3 illustrates the increasing areas of spot images 55 as the lens adjustment position is displaced from the perfect adjustment position which coincides with the vertical coordinate 56 of a curve 57. Coordinate 56 intersects the spot area abscissa 58 just below the minima point 59 on curve 57, of almost zero spot area. The curve 57 represents the spot area of the light impinging on the sensor 4, which increases symmetrically as the focus of the light beam reflected from the test lens is varied in opposite directions from perfect focus at the center of curvature of the test lens surface within a focus range.

The detection of spot images by the sensor 4 is limited by small, but finite surface areas thereon from which signal responses to impinging light are received. These small generating surface areas or elements on the sensor are referred to as "pixels" and in order to generate a reliable pulse signal, the area of the spot image equal to at least 4 to 6 pixels must be illuminated before any signal is detected. This minimum threshold is established by a filter covering the surface of the spot image sensor. In accordance with the present invention, an operative focus range for spot area change is established by the intersection of curve 57 with a signal intensity threshold line 60 in FIG. 3. Thus, any lens focus adjustment beyond the range, as shown in FIG. 3, will not be effective to produce any signal output from the sensor.

The lens group 14 is displaced duuring a measurement cycle along the optical axis thereof in incremental steps within the focus adjustment range by motion control 6 through a stepper 74 as schematically shown in FIG. 2. Details of the drive connection between the moving lens group 14 and the stepper motor are disclosed in prior copending application Ser. No. 124,193 aforementioned.

Figure 4:
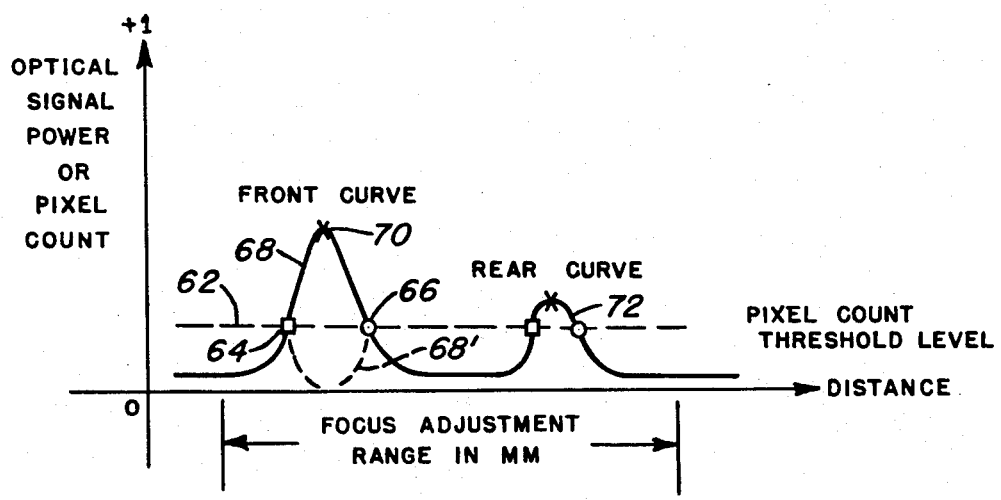
FIG. 4 is a wave-form diagram showing optical signal power or pixel count within the focus range of the test lens.

A typical wave-form curve portion 68 of sensor signal power versus lens displacement is shown in FIG. 4. Throughout the focus range, there are a plurality of significant points, indicative of the number of activated pixels of the sensor 4, including the start and stop threshold points 64 and 66 at intersections of curve portion 68 with an electronically established threshold line 62. The curve portion 68 indicates a rising signal level toward peak 70 as lens focus adjustment approaches the optimum focus position. The characteristic of curve 68 is unexpected because at perfect focus, the reflected light impinging on the sensor covers an area less than the minimum pixel threshold. An expected pixel curve 68' as shown in FIG. 4 should follow curve 57 in FIG. 3. The actual positive characteristic of curve portion 68 in FIG. 4 therefore reflects a phenomenon that is not understood but it has been found that peak point 70 on such curve is a reliable basis for determining the position of optimum focal adjustment for the lens group 14. Alternatively, or for conformation, the position of optimum focus for the lens is determined in accordance with the present invention by bisecting the distance between the start and stop points along the abscissa representing the lens adjustment displacement.

The actual signal power curve portion 68 shown in FIG. 4 is obtained during lens adjustment within a focus adjustment range which also covers a second curve portion 72 of lower amplitude. The front test lens surface is responsible for curve portion 68 while the rear surface of the test lens having a center of curvature offset from that of the front surface is responsible for the second curve portion 72 of lower amplitude. Location of the position of optimum focus for the rear test lens surface is determined in the same manner from the start and stop points on curve portion 72 where it is intersected by the threshold line 62.

Figure 5:
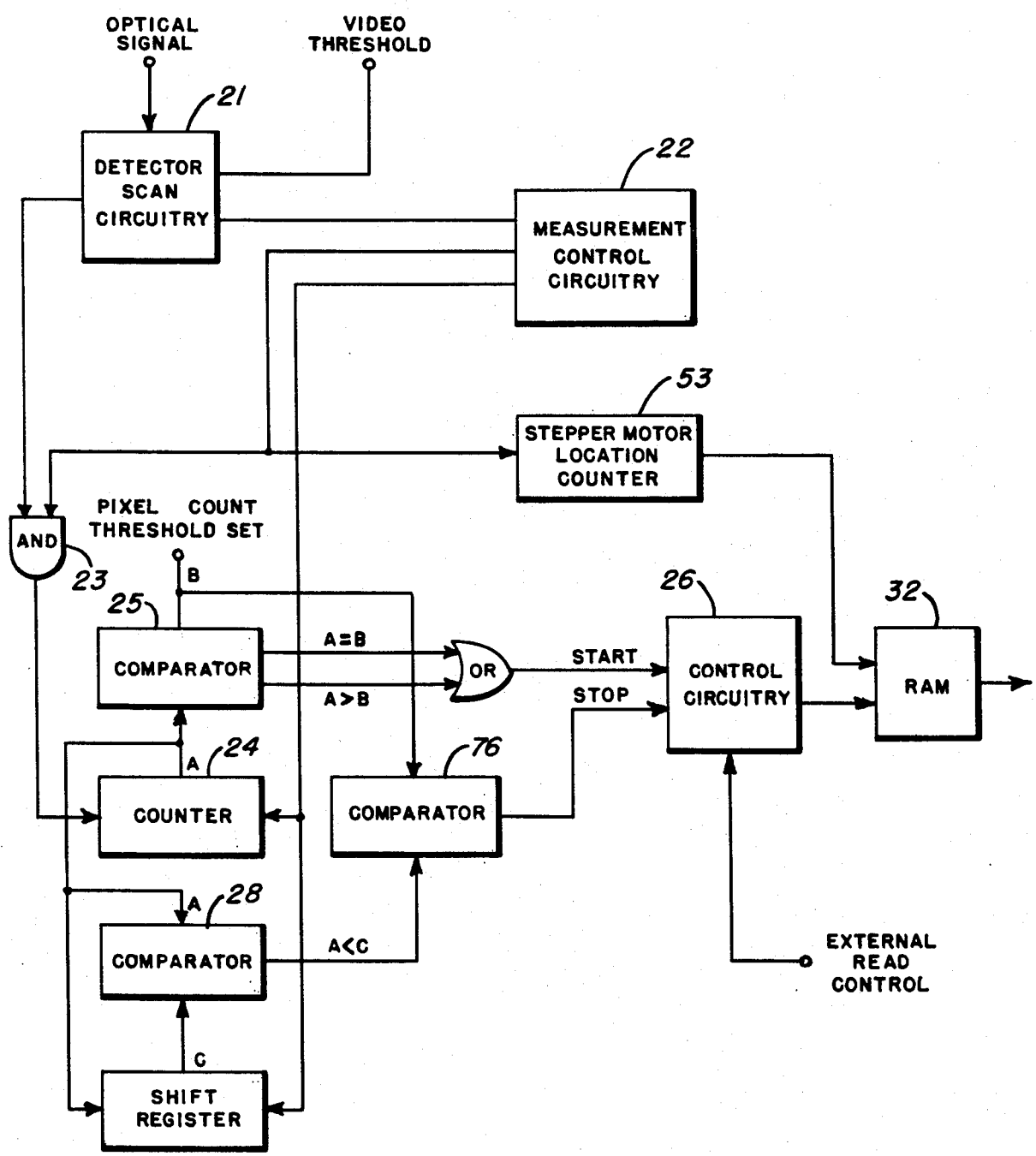
FIG. 5 shows in block diagram form more specific circuit features of the electronic signal processing system.
Figure 6:
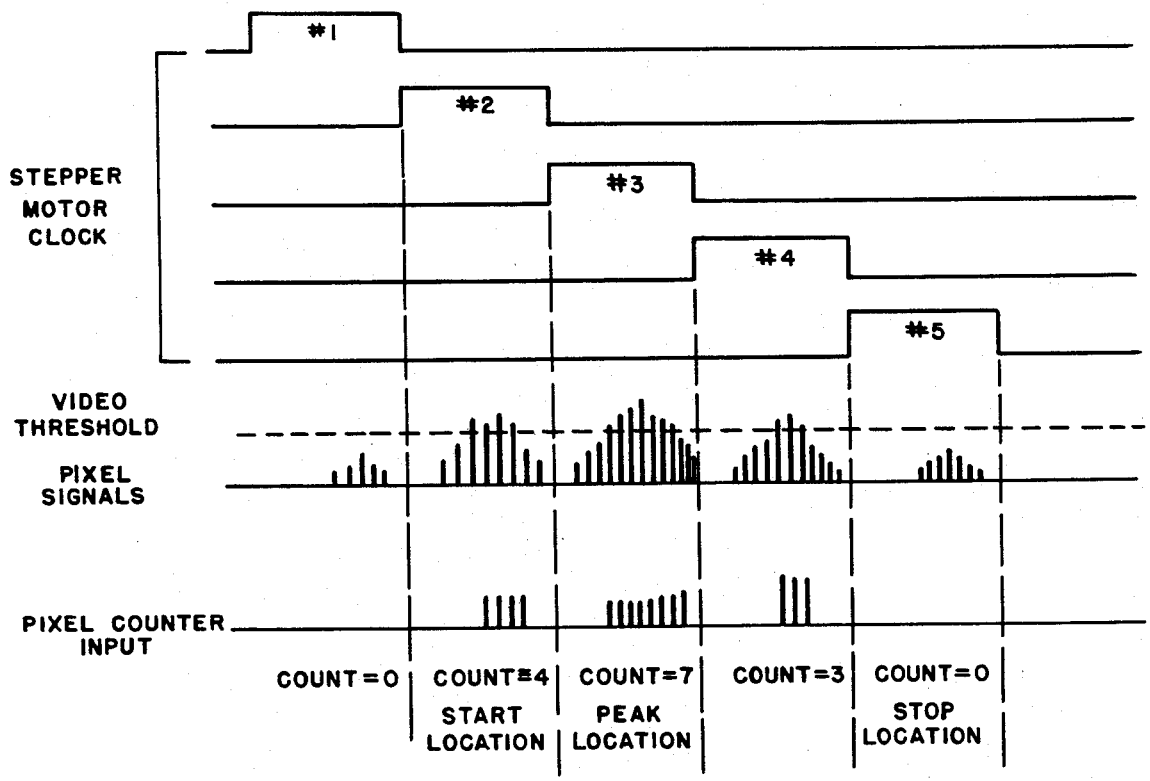
FIG. 6 is a wave-form diagram of exemplary pixel signal counts in sequential measurement cycles for a lens under test.

The manner in which the start, stop and optimum focus locations are determined from the reflected optical signal will be more readily understood with reference to FIGS. 5 and 6. Referring to FIG. 5, the optical information is received by the sensor circuitry 21 where it is processed in accordance with timing and control signals generated by measurement control circuitry 22. A manual video threshold adjustment to the circuitry 21 allows the setting of a video processing level above the system noise level. The "pixel" signals from the sensor 4 are fed by circuitry 21 to And gate 23, which also receives a motor step pulse from measurement control circuitry 22. The output of And gate 23 provides a pixel signal input to pixel counter 24 whose output is compared to a pixel count threshold via comparator 25. FIG. 6 shows examples of pixel counter inputs corresponding to pixel signals above the video threshold during a sequence of stepper motor clock periods. In the first clock period, the count is zero; during the second clock period, the count is four; during the third stepper motor clock period, the count is seven; during the fourth period, the count is three; and in the fifth stepper motor clock period, the count is zero.

The pixel count threshold is a predetermined value which is manually set. It establishes a predetermined number of pixels that are sufficiently illuminated such that all count levels above the predetermined value indicate the occurrence of the transition range of a reflected optical signal peak. A typical reflected optical signal versus focusing position curve has already been described with reference to FIG. 4.

The significant data points for algorithm processing are the start and stop locations of each optical signal, as designated in FIGS. 4 and 6. The determination of the start and stop location points in the focus range will be described with further reference to FIG. 5. If the pixel counter output "A" at the completion of a focusing increment (motor step) is equal to or greater than the pixel count threshold "B", the count "A" has proceeded from a lower level towards a higher level, then comparator 25 will provide a start data strobe to control circuitry 26 via Or gate 27. Ram read/write control circuitry 26 provides the correct logic function and timing for identifying the stepper motor location counter output (the increment location in the optical focus range) into the random access memory (Ram 32). The Ram has sufficient capacity to handle a minimum of two data sets, front and rear curve data, plus any anticipated additional data.

The optimum focus location is determined by also identifying the stop location. This is accomplished by comparing the previous count to the present count (location numbers) via comparator 28. Previous count "A" from pixel counter 24 is stored in shift register 31, having output "C" coupled to comparator 28. If the present count "A" is greater than the previous cycle data "C", the data is loaded in storage into shift register 31 for further comparison. If the data is equal to or less than the present count "A", comparator 28 enables comparator 76. The "stop" location is determined by comparing the pixel counter output "A" with the pixel count threshold value "B" in comparator 76 when the count valve "A" proceeds from a value above "B" to below the "B" value. The actual stop location is one focus increment greater than the signal stop location due to "after the fact" recognition. Stepper motor location counter 33 provides "stop" location data which is fed to a computational section associated with data memory Ram 32 in conjunction with control signals initiated by control circuitry 26. The computational section shown by way of example in FIG. 7 includes detectors 78 and 79 receiving the start and stop location data inputs from control circuitry 26 for storage in memories 80 and 81. Upon completion of a measurement cycle, the stop signal from the location counter causes readout of memories 80 and 81 to a calculator circuit 82 from which a midpoint location output is produced as the best focus location data.

At the completion of the total measurement interval (transversion of the focus range), the data stored in data memory Ram 32 will represent in sequence the start, stop and optimum focus loctions for the first curve portion 68, then the start, stop and optimum focus locations for the second curve portion 72 and so on. This data output may then be addressed by an external peripheral, such as a computer, via the address inputs and external read control for transmitting the data output to the computer. The computer will contain the necessary algorithm to compute from the optimum focus data the base power of the test lens and other pertinent information.

Figure 8:
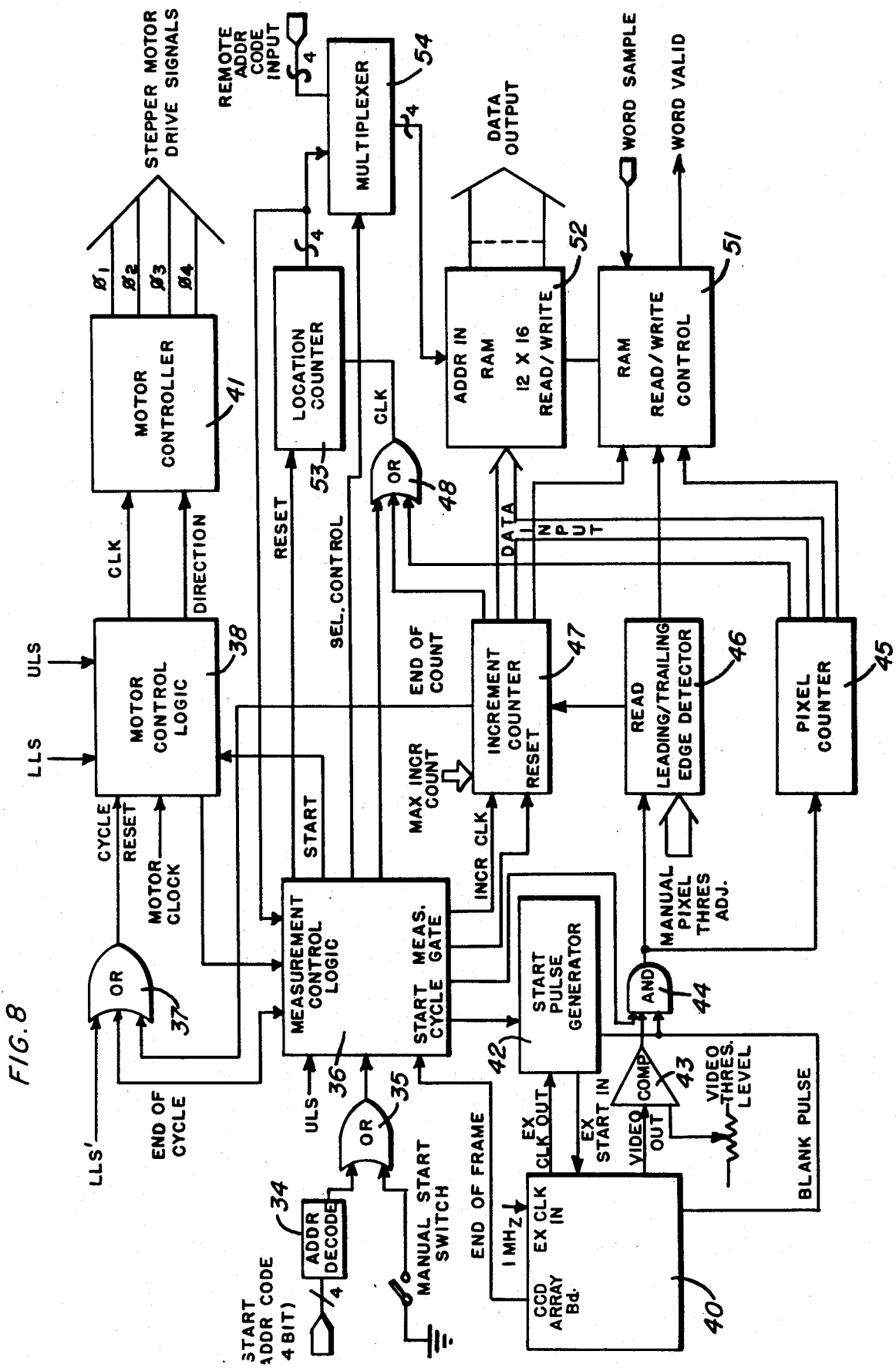
FIG. 8 is a block diagram of the electronic signal processing and motion control systems of FIG. 1.

FIG. 8 shows a block diagram of the electronic signal processing and motion control system of FIG. 1 in greater detail. A four bit start address code is coupled via address decoder 34 and Or gate 35 to measurement control logic 36. Or gate 35 has a further input coupled to a manual start switch for alternate operation in a manual mode. Lower limit switch (LLS) and upper limit switch (ULS) elements are position responsive and provide inputs through Or gate 37 to motor control logic 38 and to measurement control logic 36, respectively. Motor control logic 38 is coupled to motor controller 41 which provides stepper motor drive signals at its output. Measurement control logic 36 provides an end of frame signal from the image sensor board 40. Measurement control logic 36 provides start outputs to motor control logic 38 and start pulse generator 42. Start pulse generator 42 couples an external start input to sensor array board 40, and receives a blanking pulse from sensor array board 40. The image sensor board 40 is operated by a one megahertz external clock, which clock signal is also coupled to start pulse generator 42. The video output from the sensor array is coupled to comparator 43 for comparison with the predetermined video threshold level. The output from comparator 43 is coupled to And gate 44, which further receives the blanking pulse from sensor array board 40, and a measurement gating pulse from measurement control logic 36. The array gated video signal at the output of And gate 44 is coupled to pixel counter 45 and leading/trailing edge detector 46, which has a manual pixel threshold adjustment. The edge detected gated video signal is coupled to increment counter 47 which further receives measurement gating and increment clocking pulse inputs. Increment counter 47 has a maximum increment count adjustment and provides an end of count output signal to Or gate 37. Increment counter 47 further receives a reset input from measurement control logic 36 and provides an output to Or gate 48 and Ram read/write control 51. Pixel counter 45 further supplies an output to Or gate 48 and Ram read/write control 51. Ram read/write control 51 receives an output from focus computing component 46 and provides a read/write input to Ram 52. The data input is coupled from increment counter 47 and pixel counter 45 to Ram 52. Remote address code inputs and the output from location counter 53 are coupled via multiplexer 54 to the address of Ram 52 which provides the data output to the computer.

Figure 7:
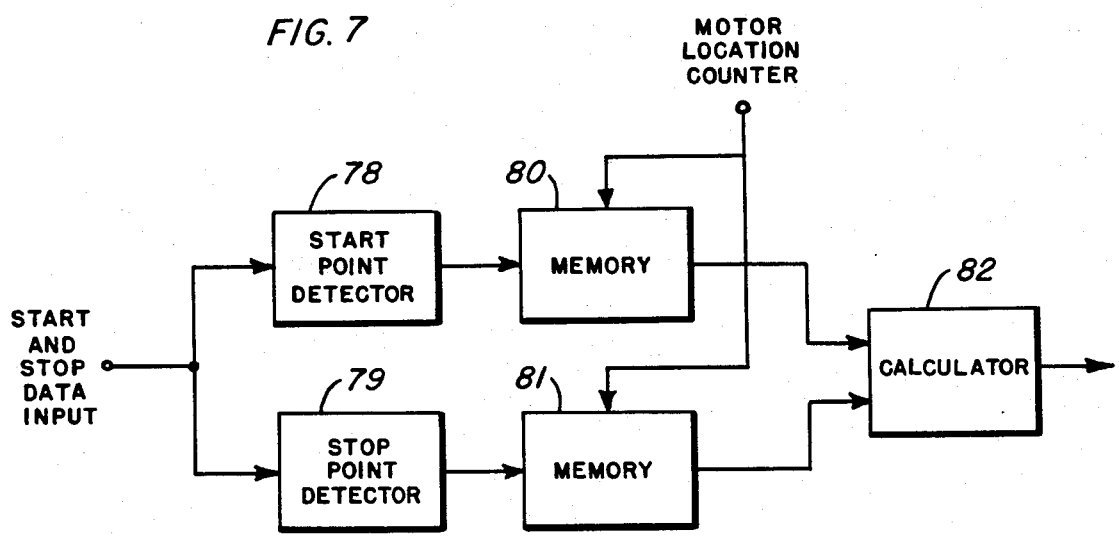
FIG. 7 is a block diagram of an electronic computational section of the signal processing system.
Figure 9:
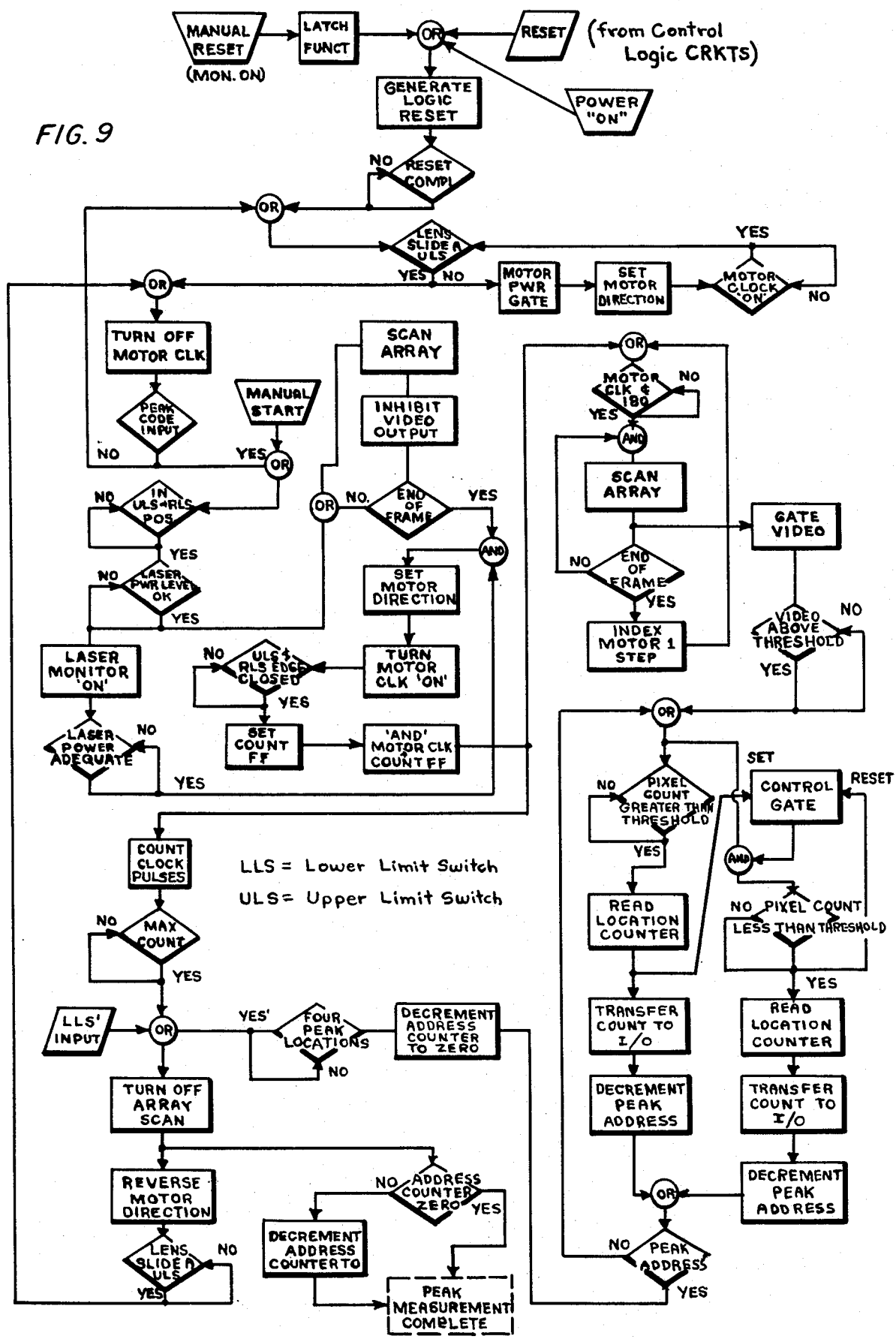
FIG. 9 is a flow chart of the measuring and testing system of the invention.

The operation of the system as depicted in FIG. 7 will now be described with particular reference to FIG. 9. When power is applied to the measuring system, an automatic logic reset is generated. This reset function can also be generated by manual operation of a front panel control switch 33 by an external source or upon completion of a measurement cycle. The reset pulse then triggers the motor control logic 38 to determine where the focusing lens assembly 14 is located by monitoring the upper and lower motion limit switches (ULS and LLS). If the focusing lens assembly 14 is not in the upper limit switch location, which is the zero displacement or "start" location, the motor control logic 38 will generate appropriate motor direction and clock signals to correctly position the focusing lens assembly 14.

Automatic measurement can be initiated by a four bit address code from a remote control or a computer or via the front panel manual switch 33. Upon receipt of a start command, the measurement control logic 36 will initiate the image sensor array clock and start pulses to clear the array of any bias conditions which might be present prior to beginning the measurement routine. After acknowledgment by the "end of frame" signal from the sensor array indicating that the "array clear" routine has been completed, the motor control logic 38 will "start" the stepper motor 74. The stepper motor will then index one clock increment and the motor control logic 38 will initiate a measurement cycle during the 180° to 360° phase portion of the motor clock cycle. The cycle will allow the mechanical and electrical dynamics of the stepper motor and its load to complete motion translation of the focusing lens assembly 14 to within approximately 99% of total value. During each measurement cycle of the array (or motor step), all video information having a magnitude greater than a preset threshold level will be transmitted.

While there have been described what are at present considered to be the preferred embodiments of this invention, it will be obvious to those skilled in the art that various changes and modifications may be made therein without departing from the invention, and it is therefore intended to cover all such modifications as fall within the true spirit and scope of the invention.

I claim:

1. A signal processing system for determining an optimum point in an operational cycle consisting of a plurality of sequential periods, comprising:
   a signal source;
   means responsive to said signal source for producing pulses during said plurality of sequential periods;
   selecting means for selecting said pulses which are above a minimum threshold, and producing selected pulses;
   counter logic means for counting said selected pulses during said plurality of sequential periods, and producing a pulse count for each respective period;
   pulse count comparison means responsive to the pulse count for each respective period for detecting at least two data points at which the pulse count of said counter logic means reaches a predetermined level; and
   data computing means for providing an output corresponding to the optimum point located equally spaced between said two data points.

2. The system as defined in claim 1, said pulse count comparison means comprising comparator means for determining when said two data points correspond to increasing and decreasing pulse counts, respectively, at said predetermined level.

3. The system as defined in claim 2 wherein said means responsive to said signal source for producing pulses comprises a photodetector array formed by a plurality of photo-sensitive elements; said signal source comprising a beam of radiation and means for focusing the beam on the photo-detector array along an optical axis at which the radiation beam impinges on the array over a surface of varying area during the operational cycle, said optimum point corresponding to a position of best focus of the focusing means.

4. The system as defined in claim 3 wherein said signal level of the minimum threshold corresponds to the activation of four to six of said photo-sensitive elements of said photo-detector array.

5. In combination with the system defined in claim 4, apparatus for measuring an optical characteristic of a test lens fixedly spaced from the photo-detector array along said optical axis including motor means operatively connected to the focusing means for incremental adjustment thereof between limits of a focus range during said operational cycle, said radiation beam being reflected from the test lens through the focusing means, and means responsive to said incremental adjustment of the focusing means and the output of the data computing means for providing measurement data on the optical characteristic of the test lens.

6. The system as defined in claim 1 wherein said means responsive to said signal source for producing pulses comprises a photo-detector array formed by a plurality of photo-sensitive elements; said signal source including a beam of radiation and means for focusing the beam on the photo-detector array along an optical axis at which the radiation beam impinges on the array over a surface of varying area during the operational cycle, said optimum point corresponding to a position of best focus of the focusing means.

7. In combination with the system defined in claim 6, apparatus for measuring an optical characteristic of a test lens fixedly spaced from the photo-detector array along said optical axis, including motor means operatively connected to the focusing means for incremental adjustment thereof between limits of a focus range during said operational cycle, said radiation beam being reflected from the test lens through the focusing means, and means responsive to said incremental adjustment of the focusing means and the output of the computing means for providing measurement data on the optical characteristic of the test lens.

8. Apparatus for measuring an optical characteristic of a test lens, comprising:
- a photo-detector array having a plurality of photo-sensitive elements producing pixel signals when activated by impinging radiation;
- means mounting the photo-detector array in fixedly spaced relation to the test lens along an optical axis;
- means for producing a beam of said radiation reflected from the test lens along said optical axis;
- means for focusing said reflected beam on said photo-detector array to form a spot image thereon of variable surface area;
- motor means operatively connected to said focusing means for incremental adjustment thereof during a measurement cycle, thereby varying the surface area of said spot image on said photo-detector array;
- counter means coupled to said photo-detector array for counting pixel signals produced by impingement thereon of said radiation, said counter means comprising means responsive to pixel signals above a minimum threshold;
- detection means associated with said counter means for detecting at least two data points at which the pixel count reaches a predetermined level; and
- means for generating an output corresponding to an optimum focus position of the focusing means spaced between said two data points.

9. The apparatus as defined in claim 8 wherein said output generating means further comprises comparator means for determining when said two data points correspond to increasing and decreasing pixel counts, respectively, at said predetermined level, and means for determining the location of said optimum focus position equally spaced between said two data points.

10. The apparatus as defined in claim 9 said measurement cycle consisting of a plurality of sequential periods, further comprising selecting means for limiting operation of the counter means to count pixel signals above a minimum pixel signal level during separate sequential periods of the measurement cycle.

11. The apparatus as defined in claim 8 said measurement cycle consisting of a plurality of sequential periods, further comprising selecting means for limiting operation of the counter means to count pixel signals above a minimum pixel signal level during separate sequential periods of the measurement cycle.

* * * * *